(12) United States Patent
Mackey

(10) Patent No.: US 7,129,935 B2
(45) Date of Patent: Oct. 31, 2006

(54) SENSOR PATTERNS FOR A CAPACITIVE SENSING APPARATUS

(75) Inventor: Bob Lee Mackey, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 232 days.

(21) Appl. No.: 10/453,223

(22) Filed: Jun. 2, 2003

(65) Prior Publication Data

US 2004/0239650 A1   Dec. 2, 2004

(51) Int. Cl.
*G09G 5/00* (2006.01)

(52) U.S. Cl. .............. 345/174; 345/173; 345/175; 178/18.06; 178/19.03

(58) Field of Classification Search .............. 345/174, 345/173, 175; 178/18.01–18.03, 18.05, 18.06, 178/19.03
See application file for complete search history.

(56) References Cited

U.S. PATENT DOCUMENTS

| | | |
|---|---|---|
| 4,550,221 A | 10/1985 | Mabusth |
| 4,550,310 A | 10/1985 | Yamaguchi et al. |
| 4,733,222 A | 3/1988 | Evans |
| 5,463,388 A | 10/1995 | Boie et al. |
| 5,521,336 A | 5/1996 | Buchanan et al. |
| 5,534,732 A * | 7/1996 | DeBrosse et al. ........... 257/776 |
| 5,541,652 A | 7/1996 | Jackson et al. |
| 5,933,102 A | 8/1999 | Miller et al. |
| 6,140,975 A | 10/2000 | Cohen |
| 6,147,680 A | 11/2000 | Tareev |
| 6,256,022 B1 | 7/2001 | Manaresi et al. |
| 6,297,811 B1 | 10/2001 | Kent et al. |
| 6,480,007 B1 * | 11/2002 | Beck et al. ................. 324/662 |
| 6,549,195 B1 * | 4/2003 | Hikida et al. ............... 345/173 |
| 6,600,642 B1 * | 7/2003 | Karnes ....................... 361/119 |
| 6,657,616 B1 * | 12/2003 | Sims .......................... 345/173 |
| 6,784,028 B1 * | 8/2004 | Rueckes et al. ............ 438/128 |
| 2003/0156065 A1 * | 8/2003 | Jo et al. .............. 343/700 MS |

FOREIGN PATENT DOCUMENTS

WO   WO02/100074   12/2002

* cited by examiner

*Primary Examiner*—Richard Hjerpe
*Assistant Examiner*—Leonid Shapiro

(57) ABSTRACT

One embodiment in accordance with the present invention includes a capacitive sensing apparatus. The capacitive sensing apparatus comprises a first set of interdigitated conductive traces. Additionally, the capacitive sensing apparatus comprises a second set of interdigitated conductive traces that are intertwined with the first set of interdigitated conductive traces.

42 Claims, 18 Drawing Sheets

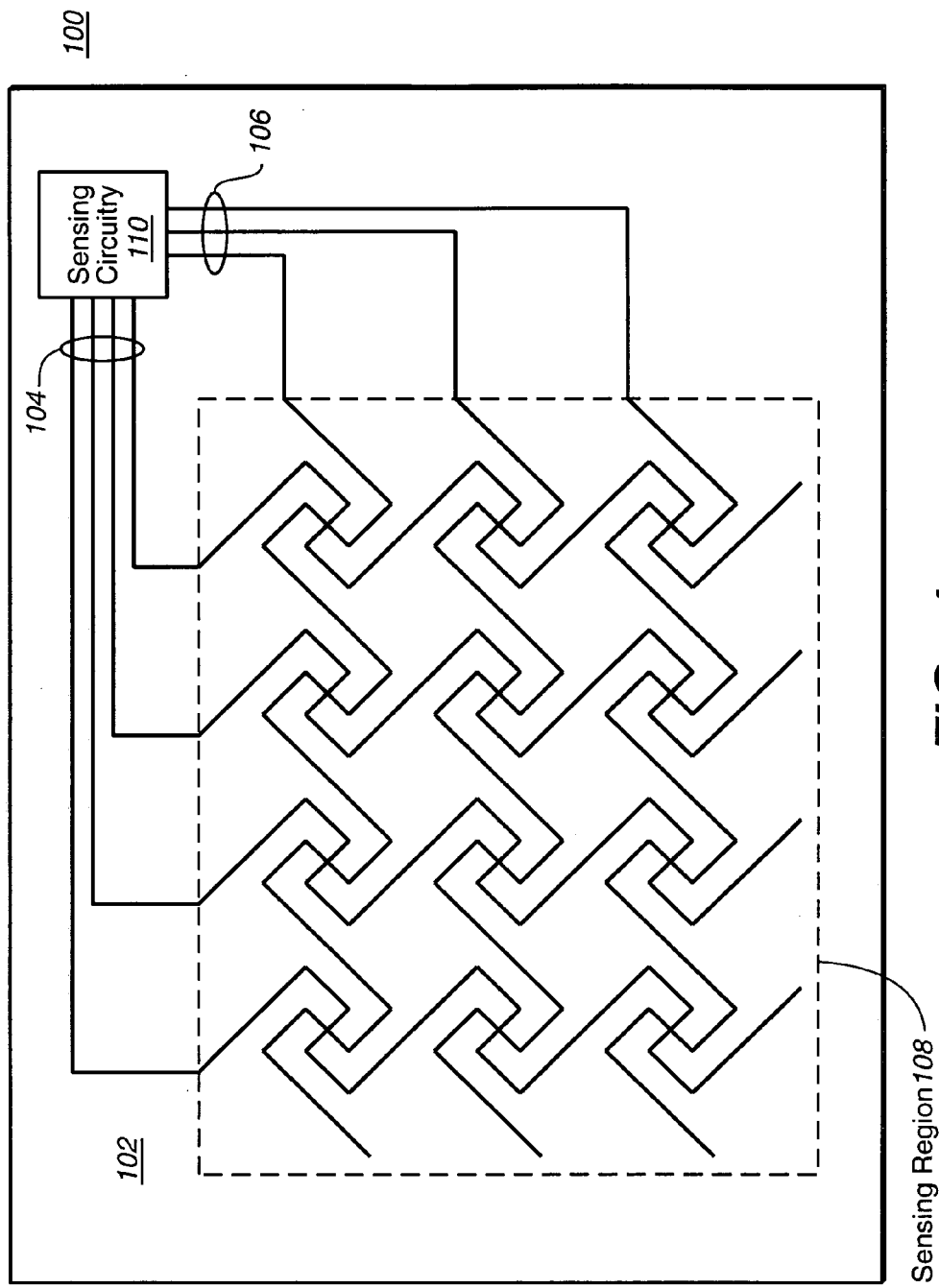
FIG._1

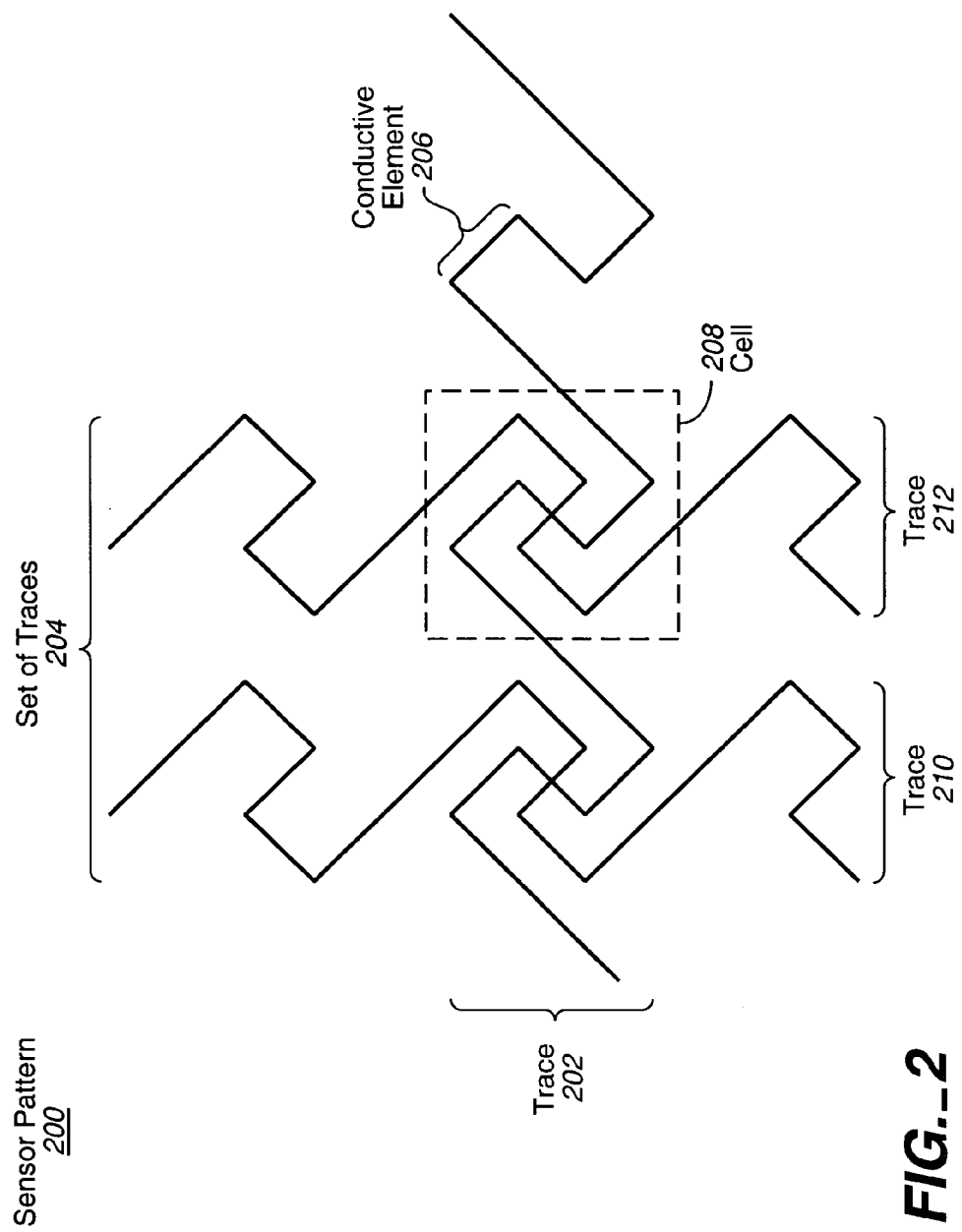
FIG._2

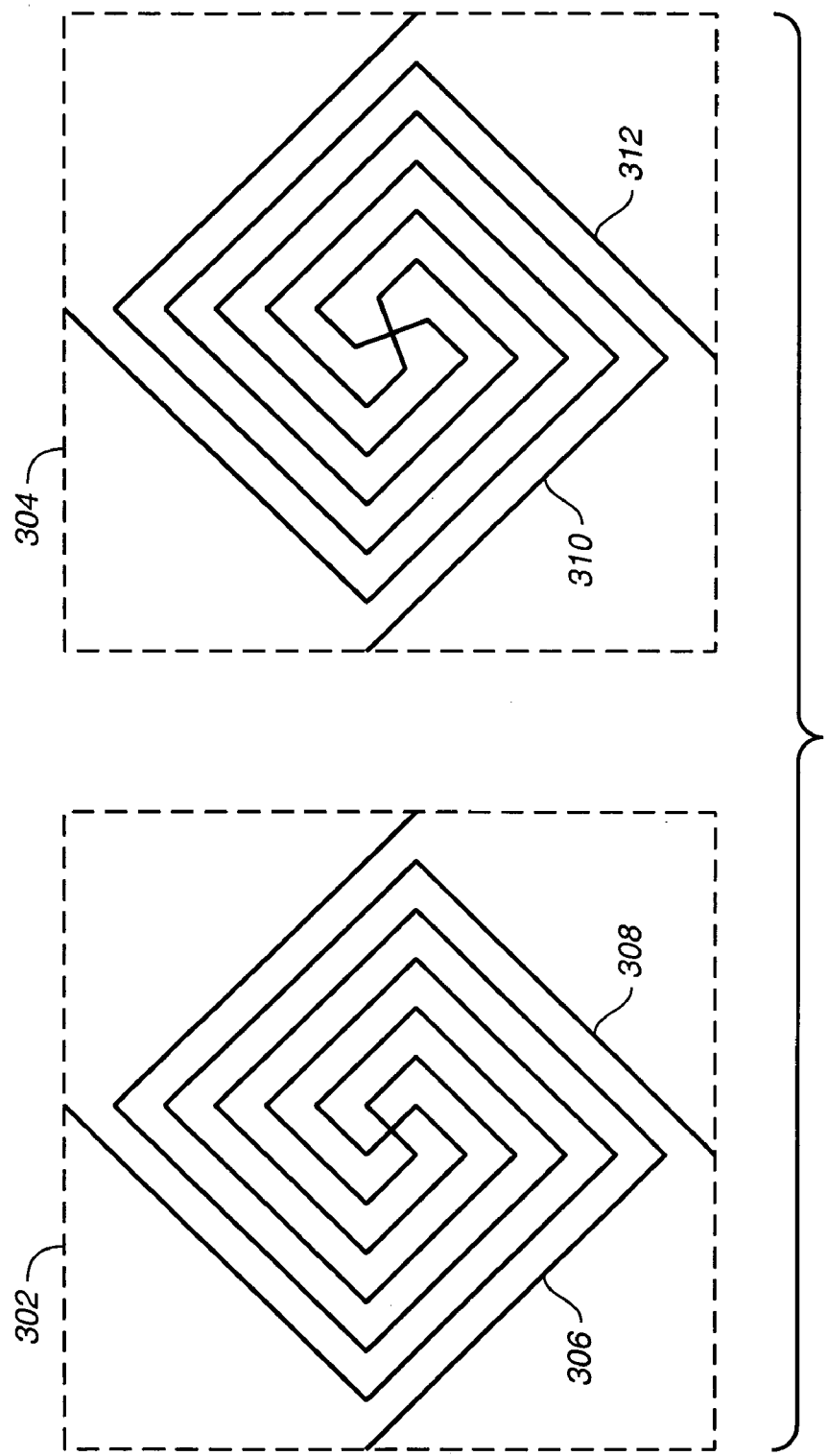
FIG._3

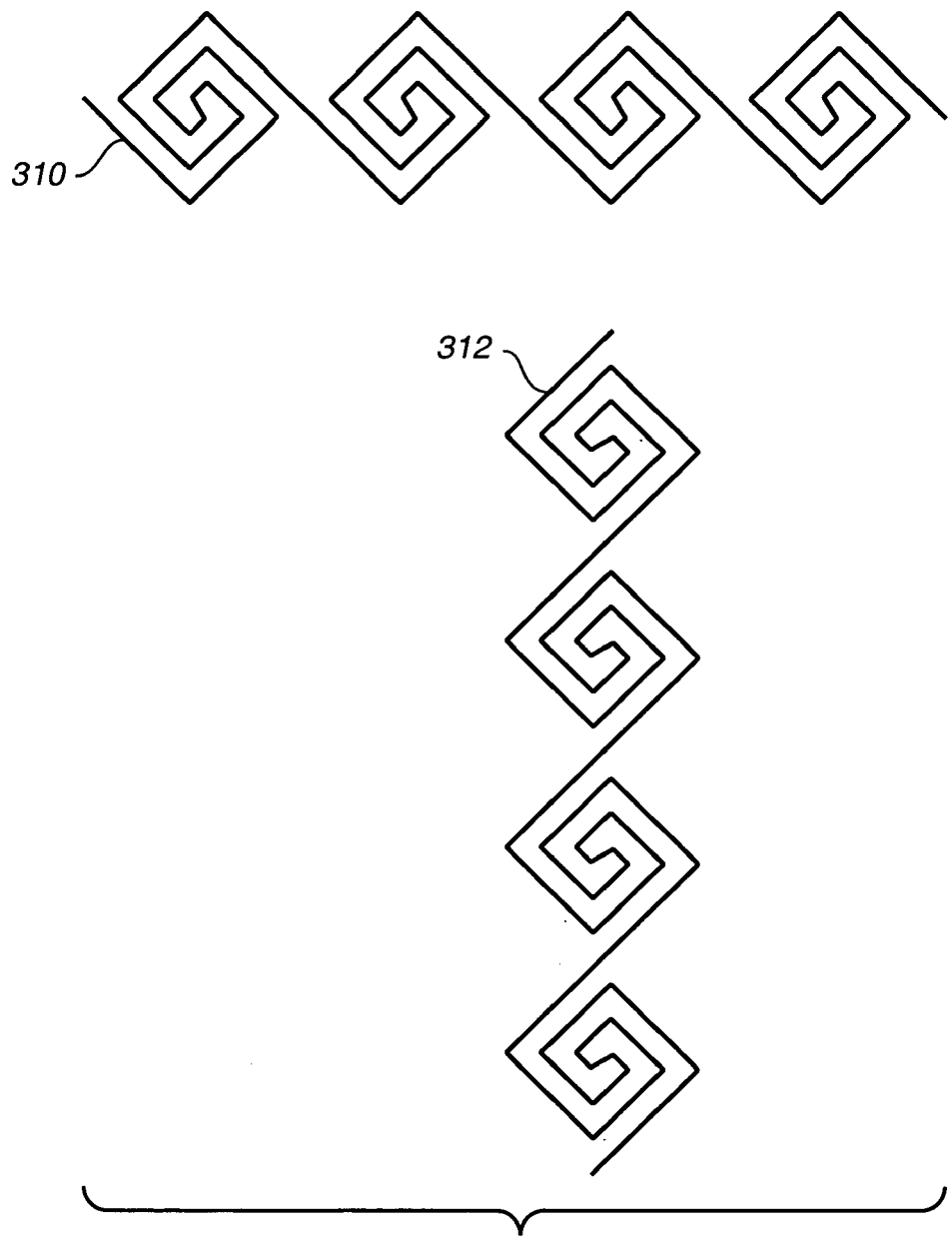
FIG._4

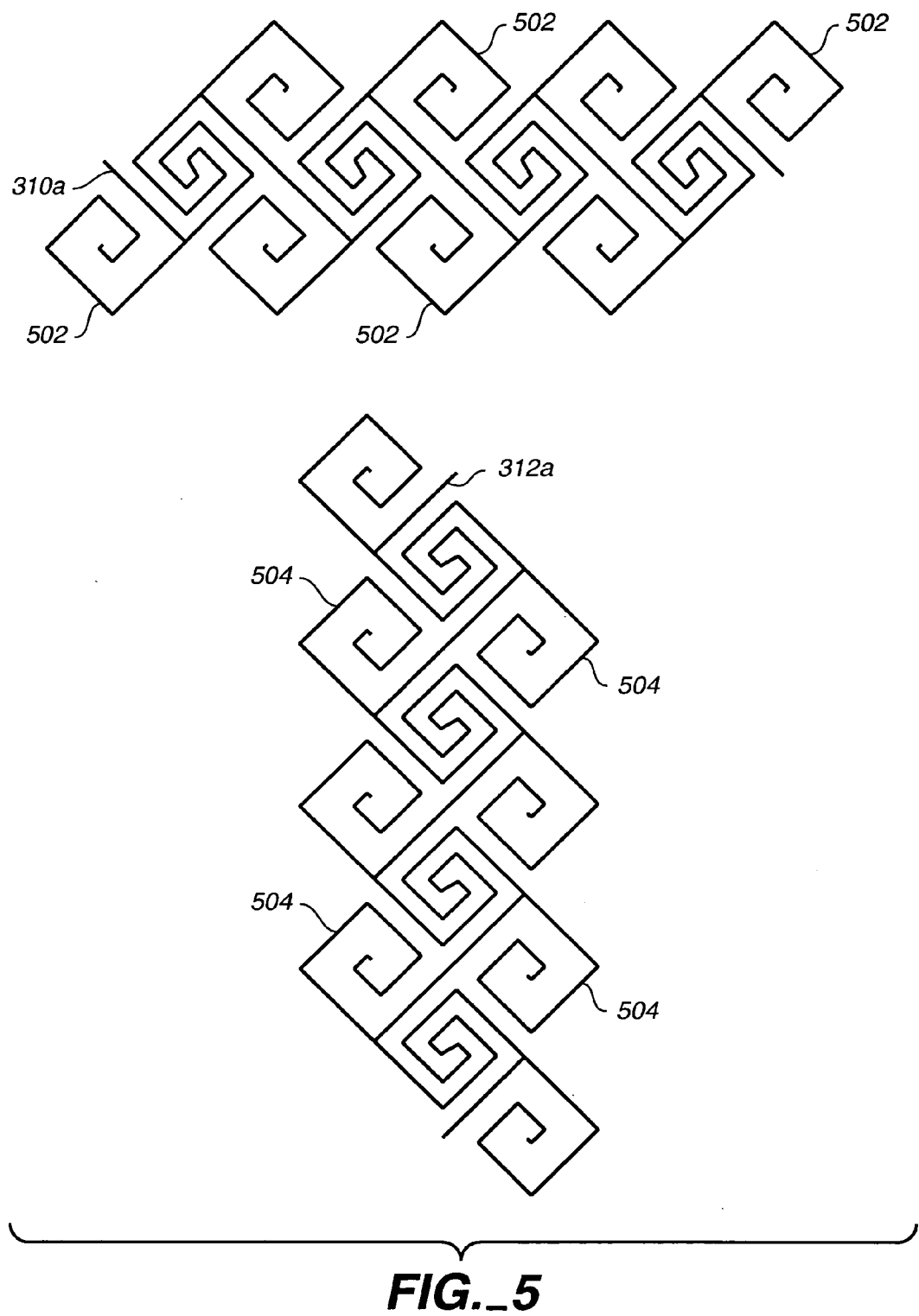
FIG._5

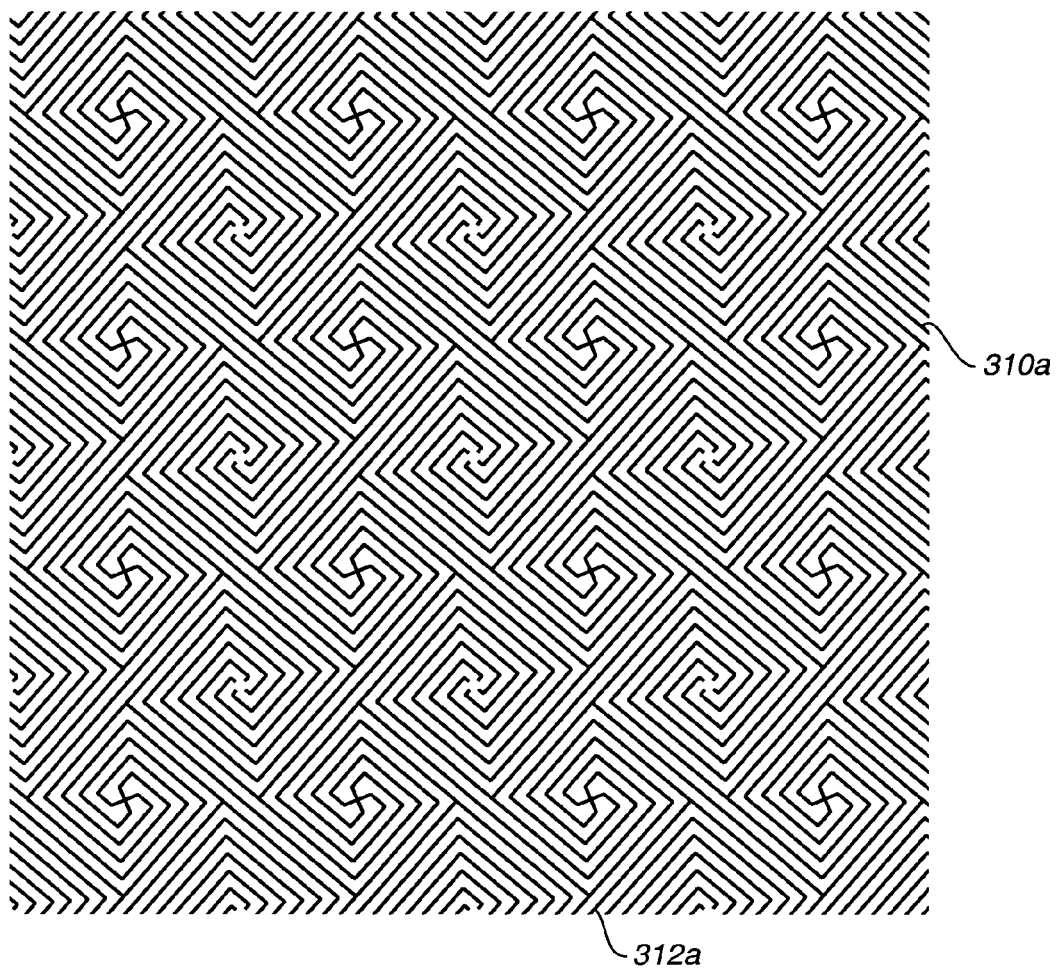
FIG._6

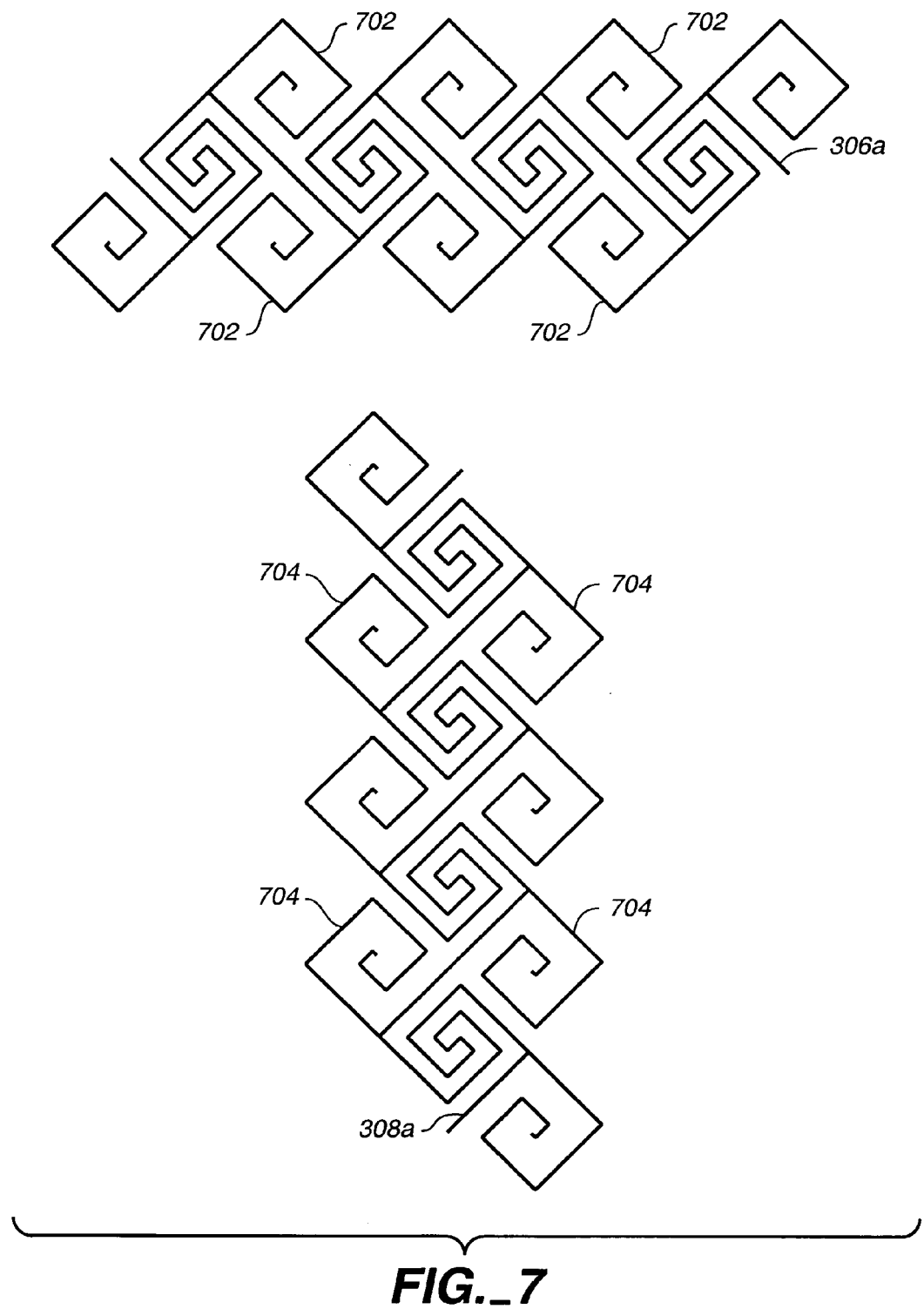
FIG._7

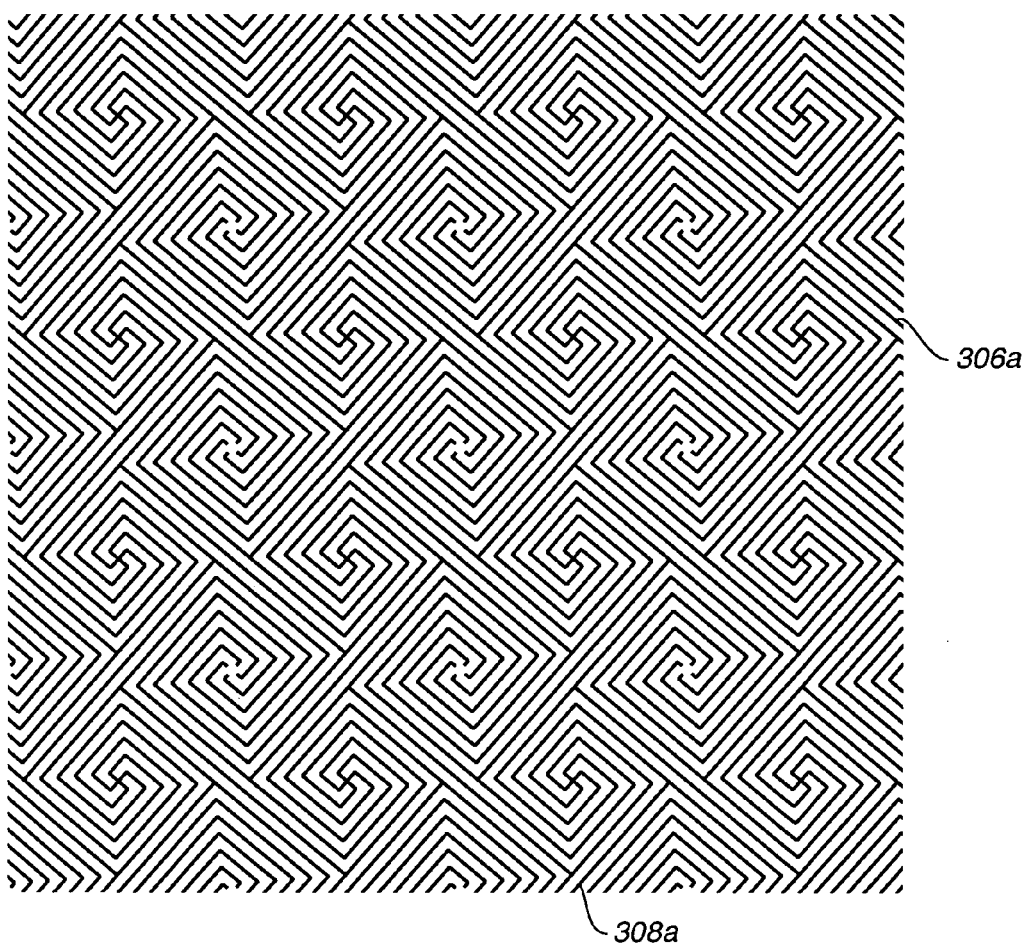
FIG._8

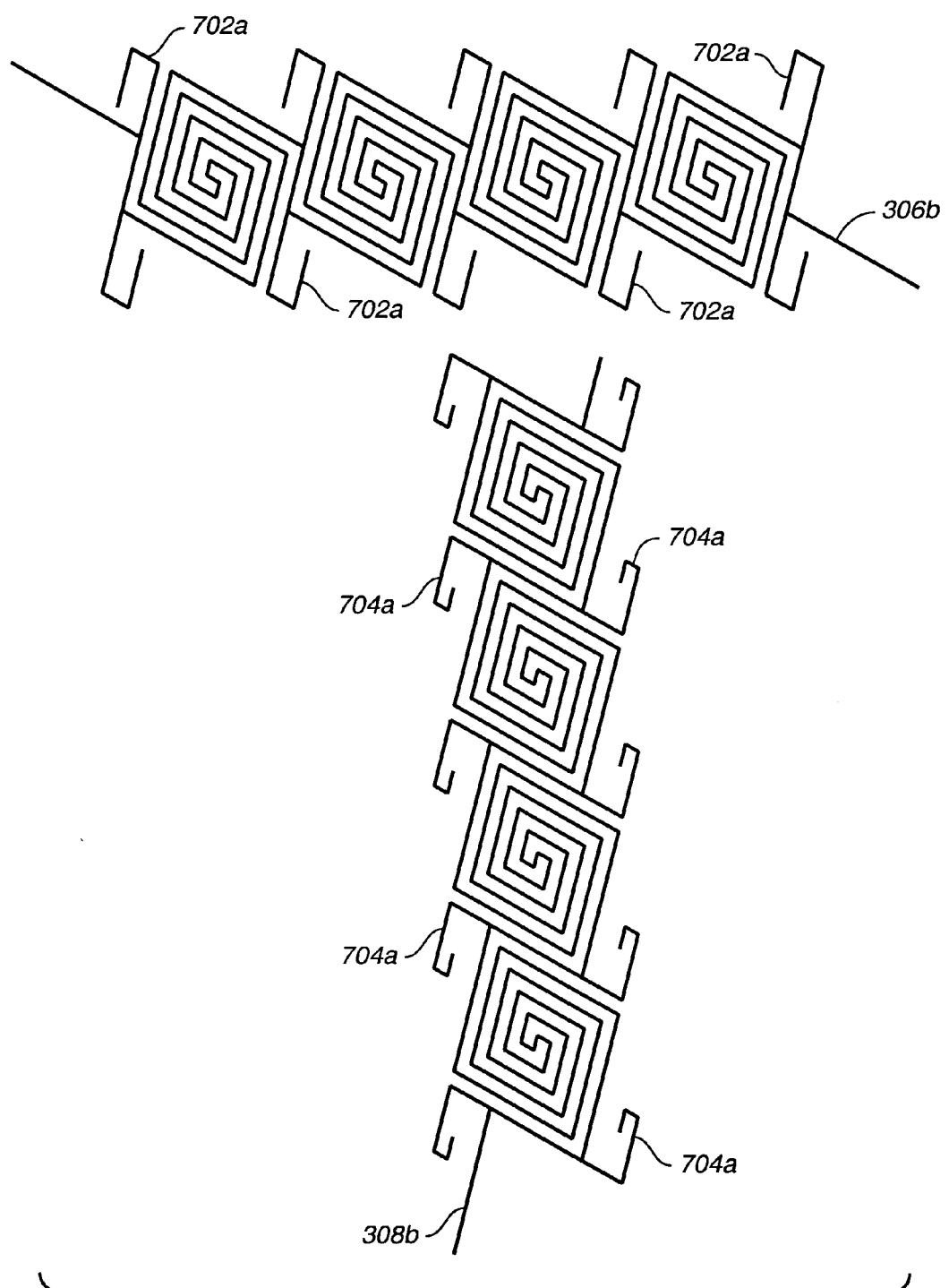
FIG._9

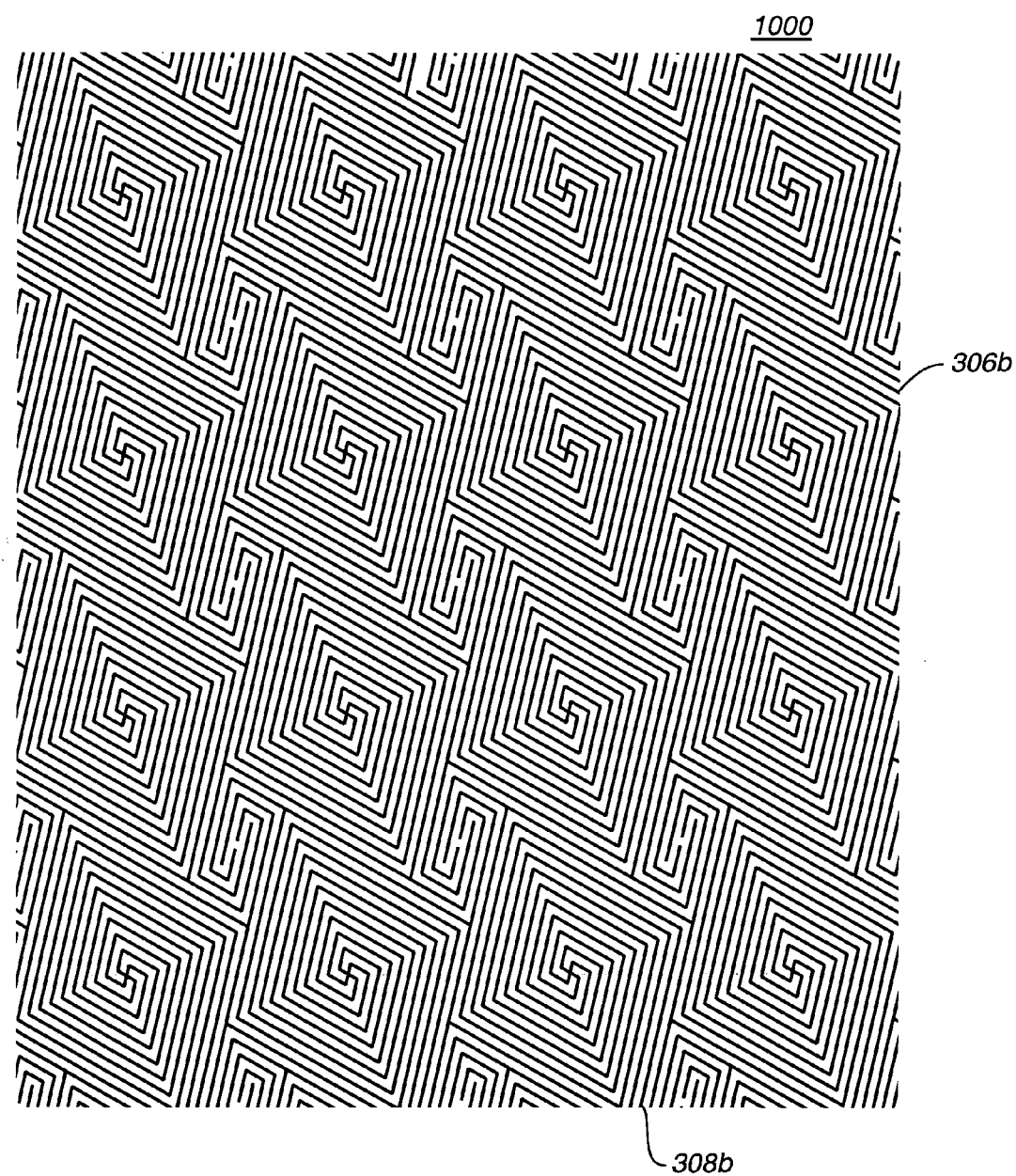
FIG._10

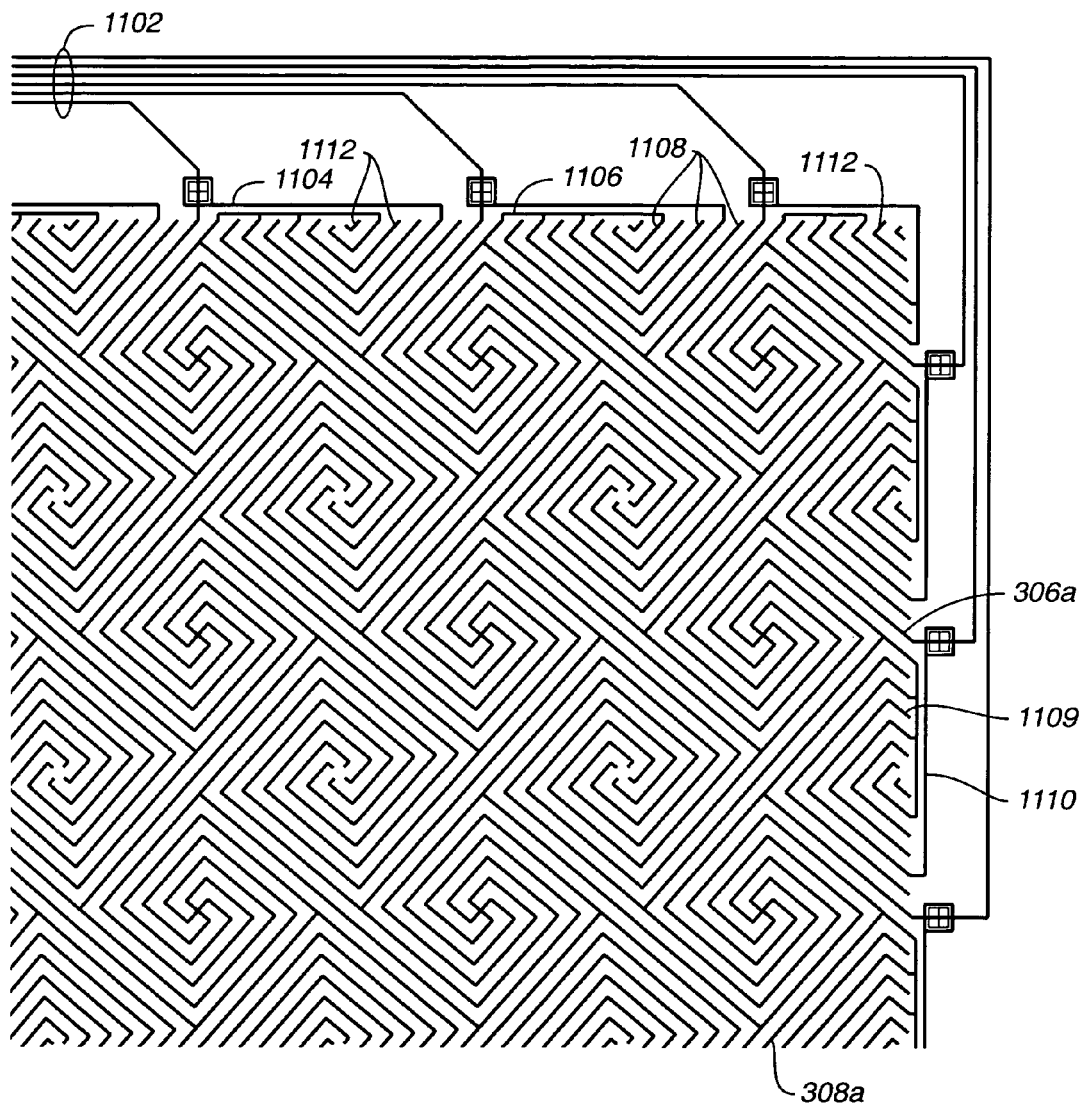
FIG._11

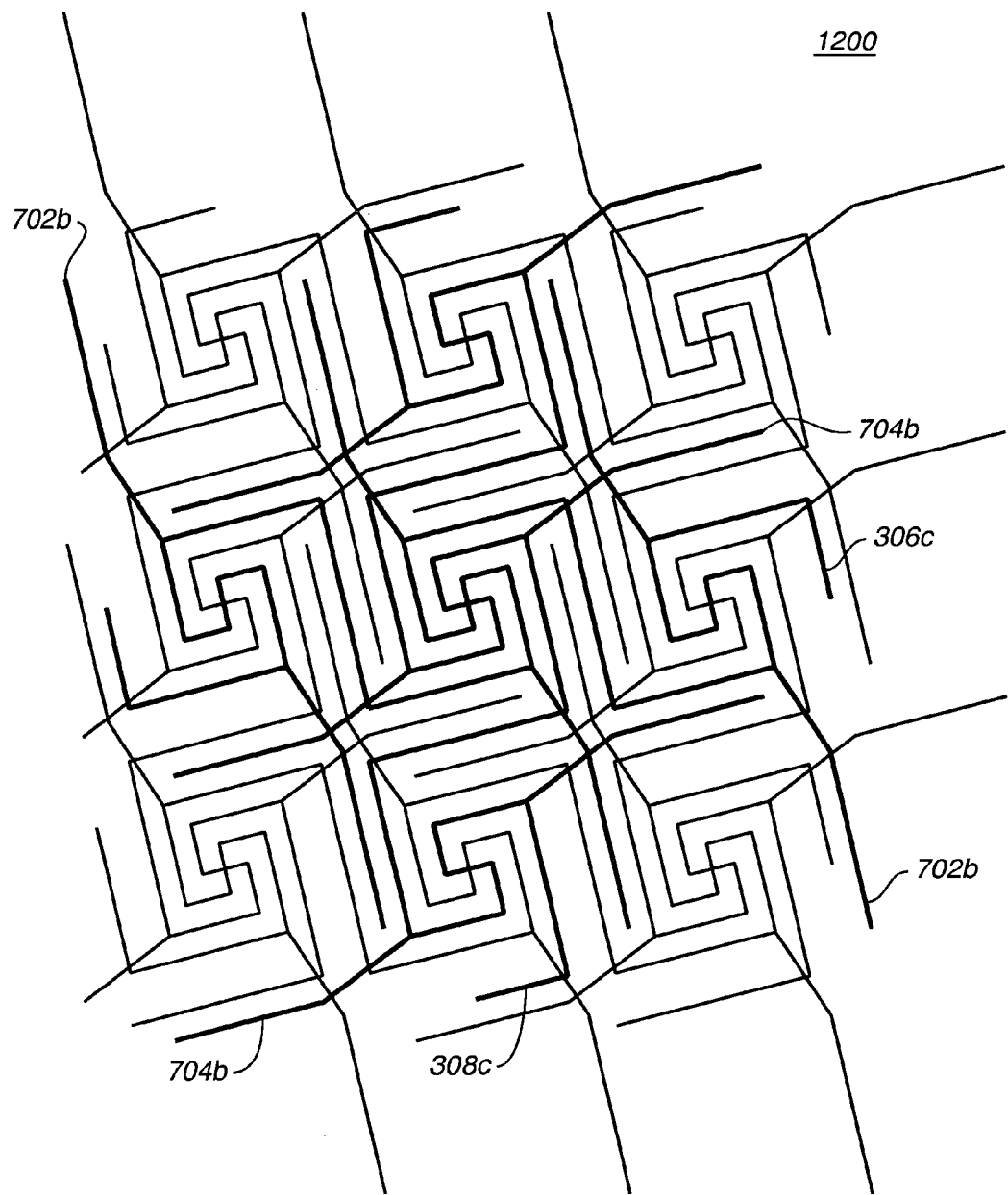
FIG._12

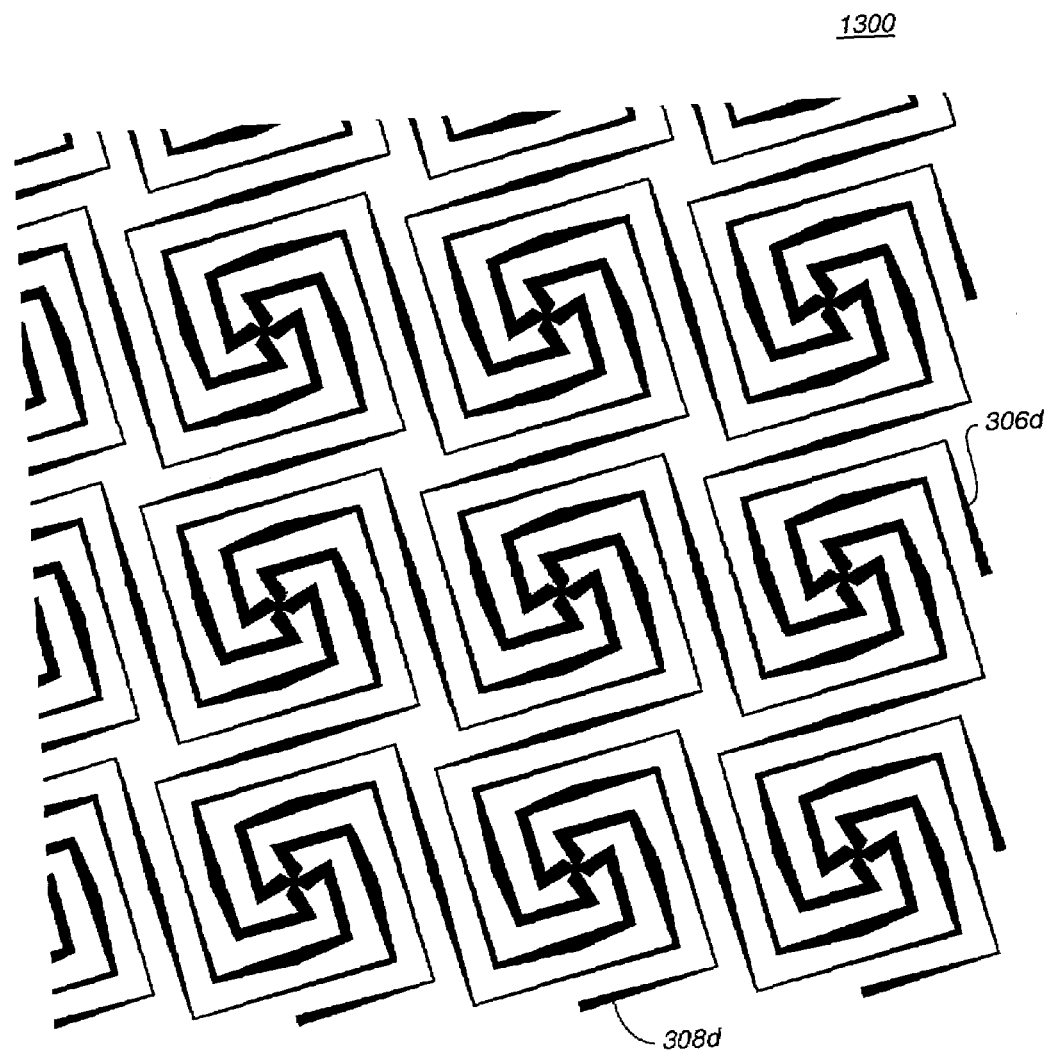
FIG._13

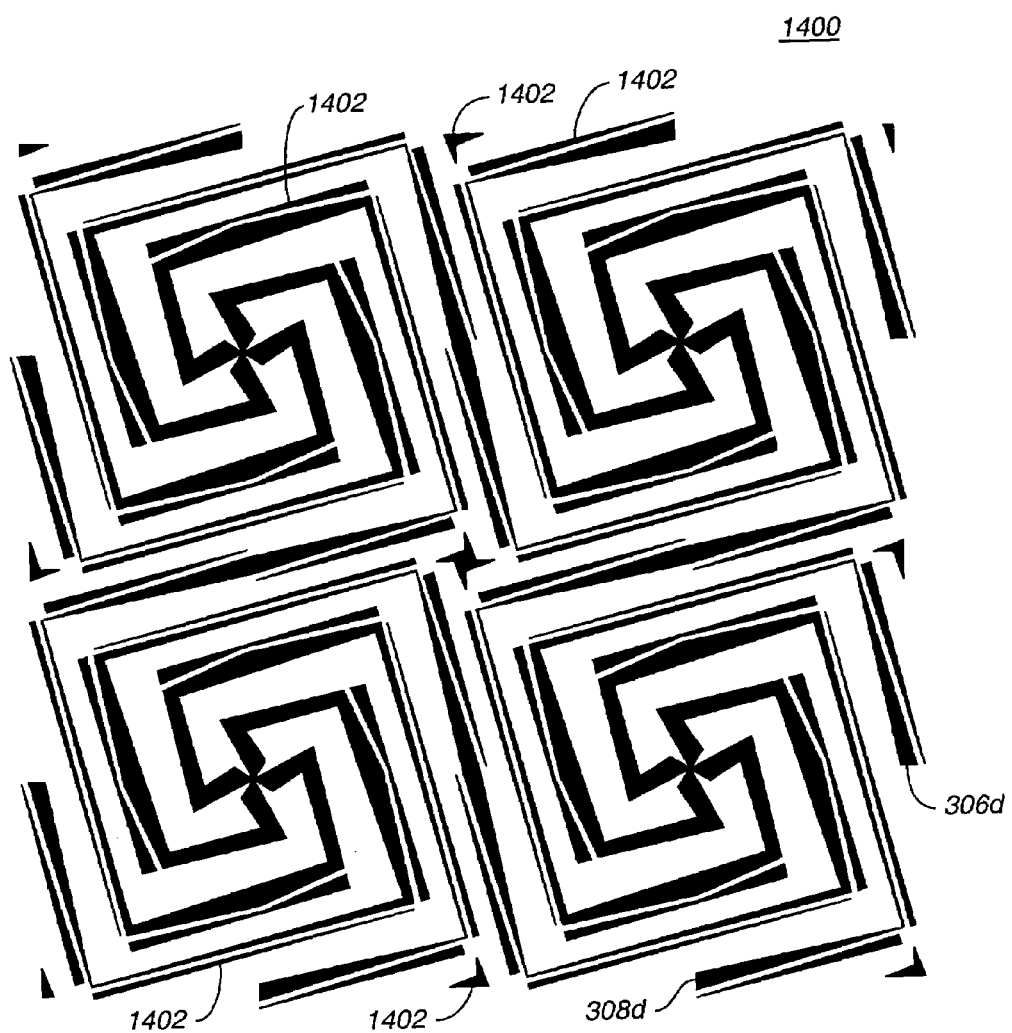
FIG._14

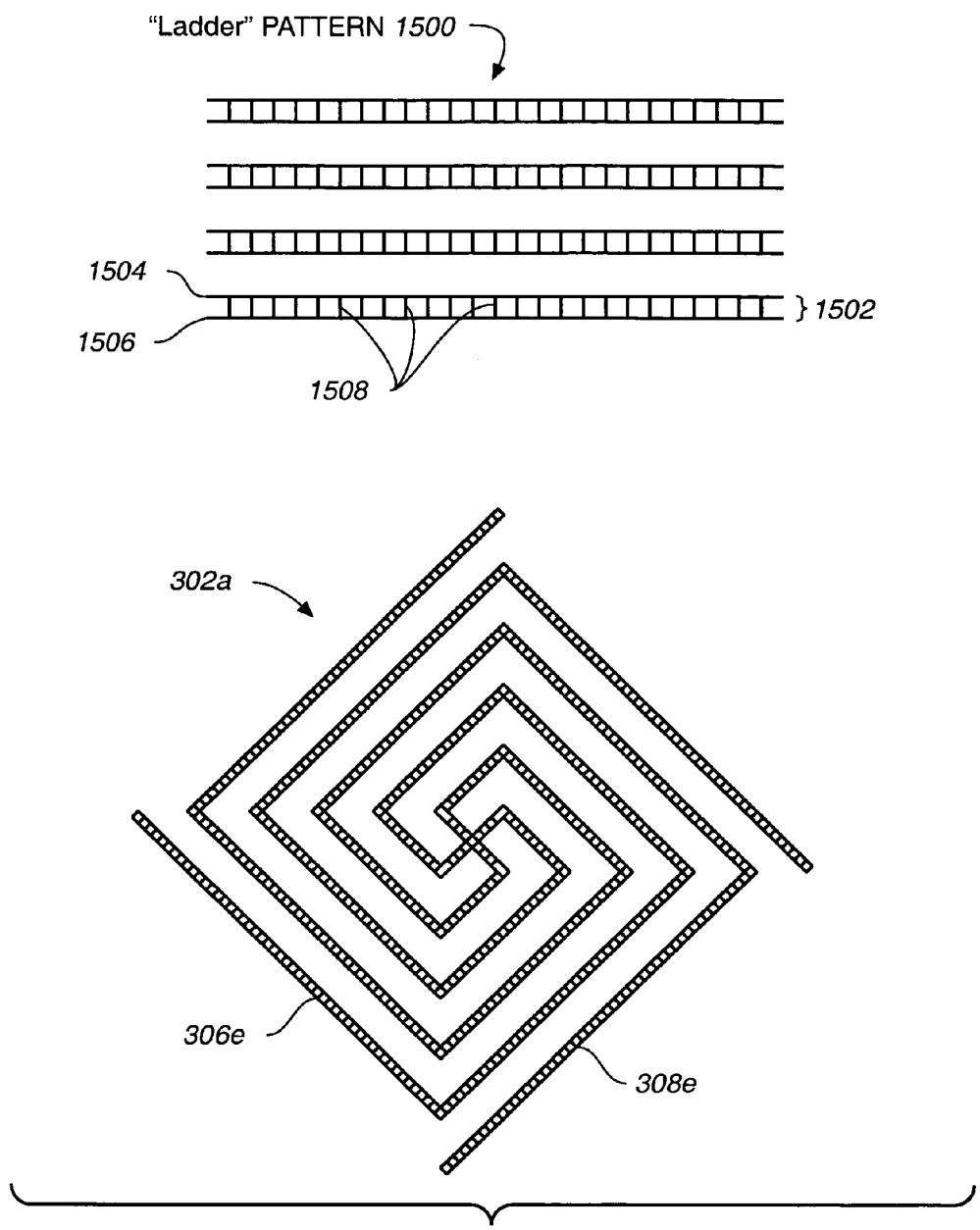
FIG._15

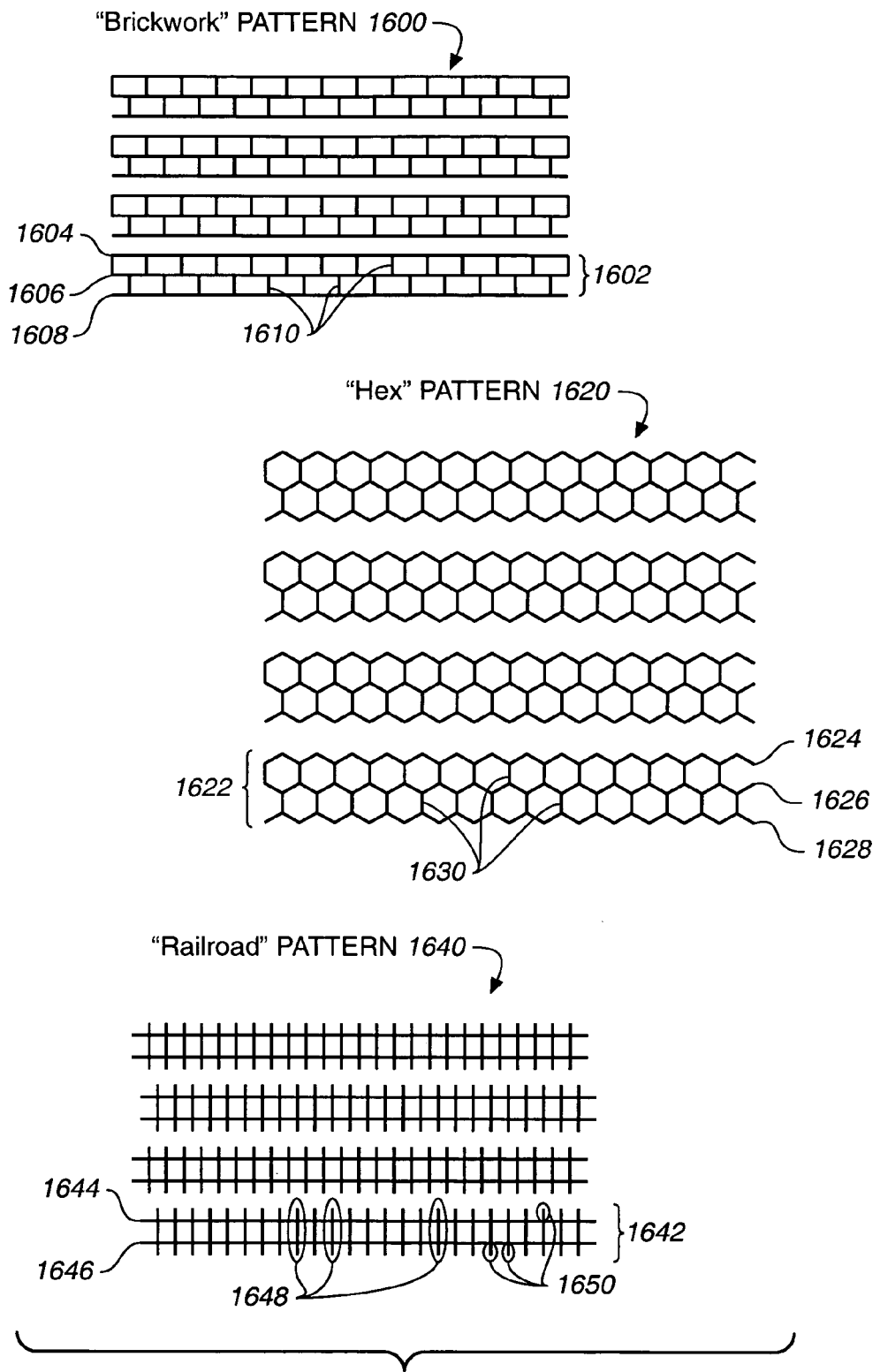
FIG._16

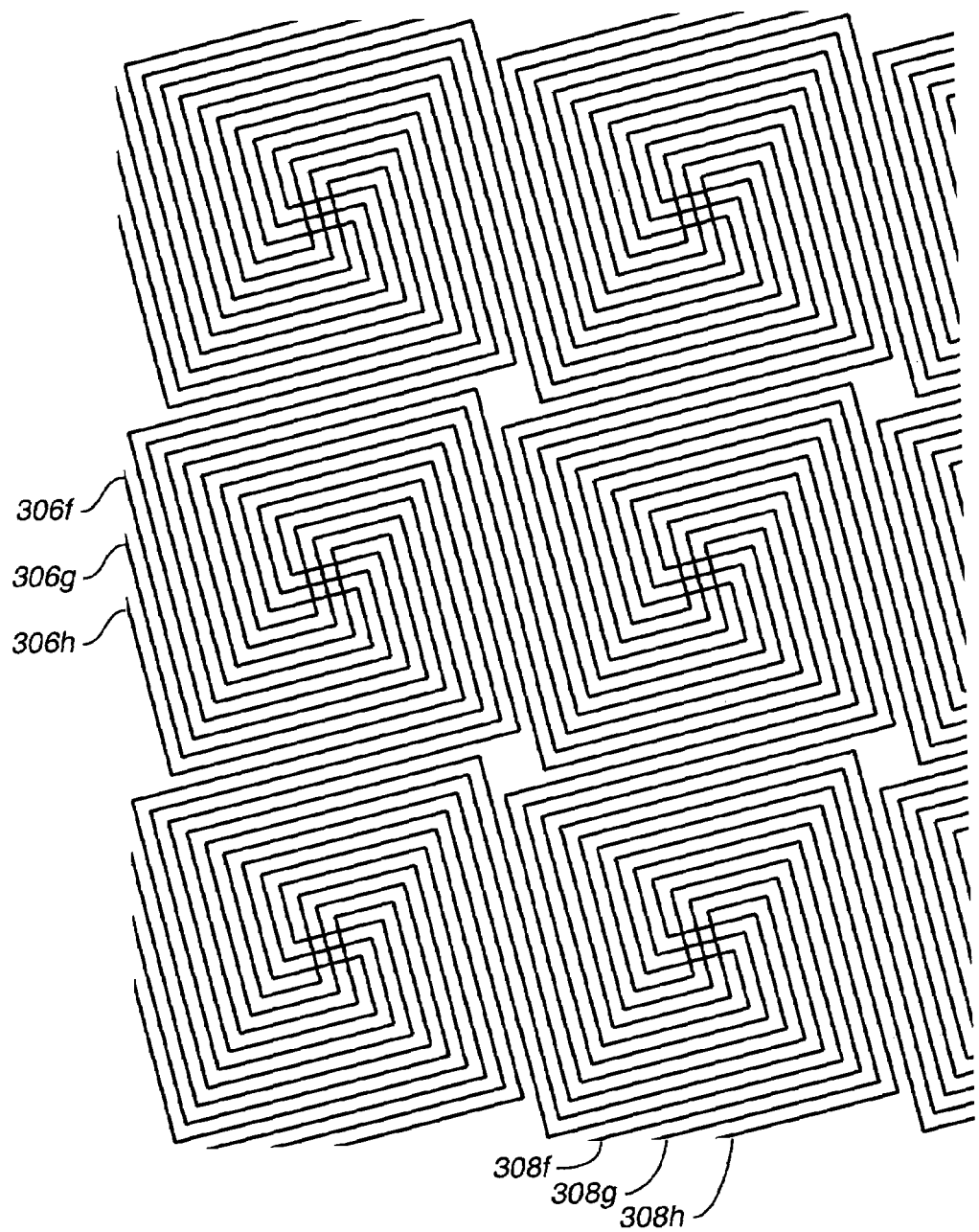
FIG._17

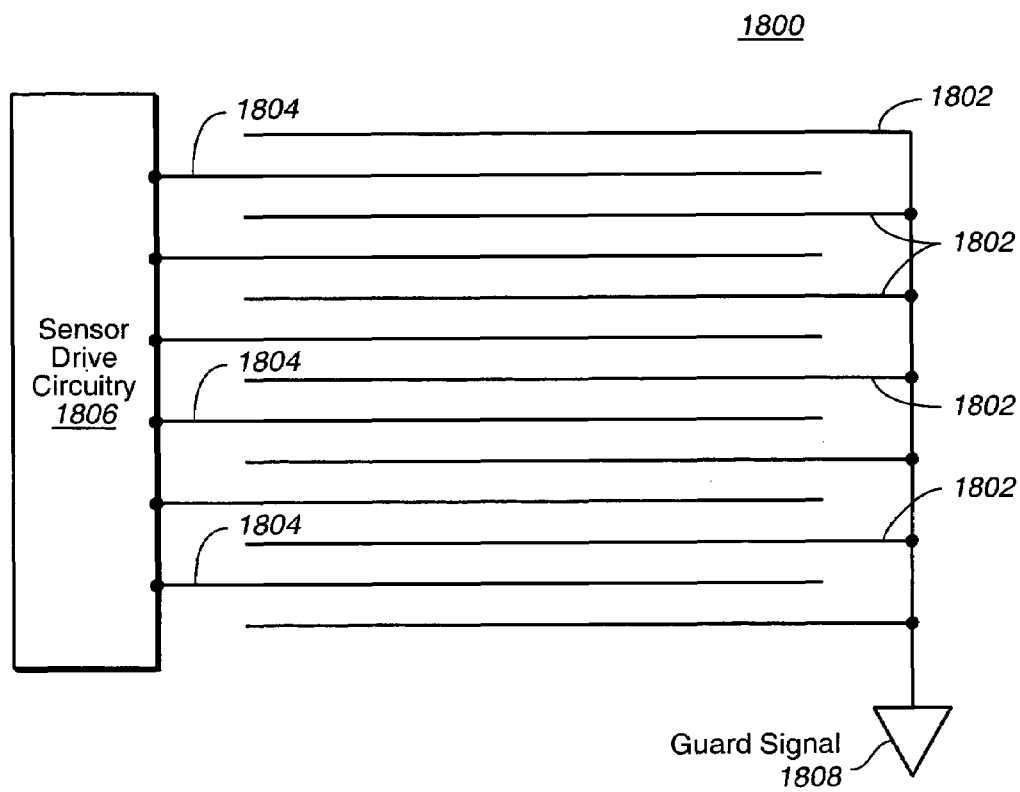
FIG._18

SENSOR PATTERNS FOR A CAPACITIVE SENSING APPARATUS

BACKGROUND

Computing devices have become integral tools used in a wide variety of different applications, such as in finance and commercial transactions, computer-aided design and manufacturing, health care, telecommunication, education, etc. Computing devices are finding new applications as a result of advances in hardware technology and rapid development in software technology. Furthermore, the functionality of a computing device is dramatically enhanced by coupling these types of stand-alone devices together to form a networking environment. Within a networking environment, computing device users may readily exchange files, share information stored on a common database, pool resources, and communicate via electronic mail (e-mail) and video teleconferencing.

Conventional computing devices provide several ways for enabling a user to input a choice or a selection. For example, a user can use one or more keys of an alphanumeric keyboard communicatively connected to the computing device in order to indicate a choice or selection. Additionally, a user can use a cursor control device communicatively connected to the computing device to indicate a choice. Also, a user can use a microphone communicatively connected to the computing device to audibly indicate a particular selection. Moreover, touch sensing technology can be used to provide an input selection to a computing device or other electronic device.

Within the broad category of touch sensing technology there exist capacitive sensing devices such as touch screens and touch pads. When a capacitive sensing device is conventionally manufactured with conductive wires or traces, local open-circuit defects can occur within one or more of these conductive traces (e.g., a speck of dust in a photolithography process, a scratch, or the like). If the conductive sensor trace has an open-circuit defect, it is typically non-functional or everything to one side of the break is disconnected from circuitry that drives it. As such, the yield of a capacitive sensor device manufacturing process is diminished by open circuit defects.

The present invention may address one or more of the above issues.

SUMMARY

One embodiment in accordance with the present invention includes a capacitive sensing apparatus. The capacitive sensing apparatus comprises a first set of interdigitated conductive traces. Additionally, the capacitive sensing apparatus comprises a second set of interdigitated conductive traces that are intertwined with the first set of interdigitated conductive traces.

BRIEF DESCRIPTION OF THE DRAWINGS

FIG. 1 is an exemplary capacitive touch screen device that can be implemented to include one or more embodiments of the present invention.

FIG. 2 is an exemplary sensor pattern for illustrating terminology in accordance with embodiments of the present invention.

FIG. 3 illustrates a portion of an exemplary sensor pattern that provides improved uniform optical density in accordance with an embodiment of the present invention.

FIG. 4 illustrates exemplary conductive traces that may be utilized to create a sensor pattern having improved uniform optical density in accordance with embodiments of the present invention.

FIG. 5 illustrates exemplary conductive traces that each include extensions in accordance with an embodiment of the present invention.

FIG. 6 is a sensor pattern in accordance with an embodiment of the present invention.

FIG. 7 illustrates exemplary conductive traces that each include extensions in accordance with an embodiment of the present invention.

FIG. 8 is a sensor pattern in accordance with an embodiment of the present invention.

FIG. 9 illustrates exemplary conductive traces that each include extensions in accordance with an embodiment of the present invention.

FIG. 10 is a sensor pattern in accordance with an embodiment of the present invention.

FIG. 11 illustrates an exemplary sensor pattern including edge traces in accordance with an embodiment of the present invention.

FIG. 12 illustrates an exemplary sensor pattern with traces that include extensions in accordance with an embodiment of the present invention.

FIG. 13 illustrates an exemplary sensor pattern formed from traces having varying width in accordance with an embodiment of the present invention.

FIG. 14 illustrates an exemplary sensor pattern including dummy elements in accordance with an embodiment of the present invention.

FIG. 15 illustrates an exemplary redundant pattern in accordance with an embodiment of the present invention.

FIG. 16 illustrates other exemplary redundant patterns in accordance with embodiments of the present invention.

FIG. 17 illustrates an exemplary multiple intertwined sensor pattern in accordance with embodiments of the present invention.

FIG. 18 illustrates an exemplary sensing apparatus that includes guard traces in accordance with embodiments of the present invention.

The drawings referred to in this description should not be understood as being drawn to scale.

DESCRIPTION OF PREFERRED EMBODIMENTS

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 1 is a plan view of an exemplary capacitive touch screen device 100 that can be implemented to include one or more embodiments of the present invention. The capacitive touch screen device 100 can be utilized to communicate user input (e.g., using a user's finger or a probe) to a computing device or other electronic device. For example, capacitive touch screen device 100 can be placed over an underlying image or an information display device (not shown). In this manner, a user would view the underlying image or information display by looking through sensing region 108 of capacitive touch screen device 100 as shown. It is noted that one or more embodiments in accordance with the present invention can be incorporated with a capacitive touch screen device similar to touch screen device 100.

The capacitive touch screen device 100 can include a substantially transparent substrate 102 having a first set of conductive traces 104 patterned thereon., Additionally, the substantially transparent substrate 102 can have a second set of conductive traces 106 patterned thereon. As such, the combination of the sets of conductive traces 104 and 106 define a sensing region 108 of capacitive touch screen device 100. Furthermore, the sets of conductive traces 104 and 106 are each coupled to sensing circuitry 110 that enables the operation of capacitive touch screen device 100.

FIG. 2 is an exemplary sensor pattern 200 for illustrating terminology in accordance with embodiments of the present invention. Sensor pattern 200 includes an exemplary conductive trace 202 that can include a continuous conductive material which extends in a first direction such as a substantially horizontal direction. However, it is understood that conductive trace 202 may be implemented to extend in a substantially vertical direction or in any other direction. Furthermore, conductive trace 202 can be implemented as a straight segment or as any other type of pattern, design, or configuration. An exemplary conductive element 206 is shown as a portion of conductive trace 202. Conductive trace 202 can be understood to include one or more conductive elements similar to conductive element 206.

Additionally, sensor pattern 200 includes a set of conductive traces 204 that comprises exemplary conductive traces 210 and 212 that are each similar to conductive trace 202. The set of conductive traces 204 extend in a second direction such as a substantially vertical direction. However, it is appreciated that the set of conductive traces 204 may extend in a substantially horizontal direction or in any other direction. The set of conductive traces 204 can include two or more conductive traces. The general direction of conductive trace 202 is also substantially orthogonal to the general direction of the set of conductive traces 204. However, conductive trace 202 and conductive trace 210 can be oriented in any manner with respect to each other.

Within FIG. 2, sensor pattern 200 also includes a sensor pattern cell 208. A sensor pattern cell (e.g., 208) may refer to a pattern unit of one or more traces that can be repeated to produce all or a portion of a sensor pattern (e.g., 200). For example, a repetitious array of sensor pattern cells similar to cell 208 produces the sensor pattern shown within the sensing region 108 (FIG. 1) of the capacitive touch screen device 100.

It is noted that conductive traces 210 and 212 are each "intertwined" with conductive trace 202. Specifically, a conductive trace (e.g., 202) can be intertwined with another conductive trace (e.g., 210) when each trace extends in a different direction and their respective trace patterns look as if they were "twisted" together. Furthermore, it is appreciated that the location where two conductive traces (e.g., 202 and 210) cross can be referred to as an intersection.

FIG. 3 illustrates an exemplary capacitive sensor pattern cell 304 that provides improved uniform optical density in accordance with an embodiment of the present invention. By comparison, sensor pattern cell 302 that can be used as part of a capacitive touch screen has nearly uniform optical density, except at its center, where traces 306 and 308 cross. That area locally has twice the optical density of the other areas of sensor pattern cell 302. This is visible from a distance as a small dark spot. As such, a repetitious array of sensor pattern cells (not shown) similar to cell 302 produces a sensor pattern having the appearance of a grid of small dark spots. However, a sensor pattern comprising a repetitious array of sensor pattern cells (not shown) similar to cell 304 of the present embodiment reduces this effect so that the eye notices an underlying image or display instead of the sensor pattern which can be part of a capacitive touch screen (e.g., 100). Specifically, sensor pattern cell 304 has been implemented with a lower optical density in the area surrounding where traces 310 and 312 cross such that the pattern is more optically uniform. As such, the effect is to reduce the visibility of a sensor pattern of cells 304 to a user.

It is noted that a uniform optical density design such as sensor pattern 304 can be beneficial to a capacitive touch screen sensor device (e.g., 100). A capacitive touch screen device can be a user input device for a computing device or electronic device. Typically such a capacitive touch screen device resides in front of a display device or image that is viewed through by its user. Therefore, it is beneficial to reduce the user visibility of the sensor pattern 304. There are other methods of modifying sensor pattern optical density in accordance with the present embodiment. For example, the width of traces 310 and 312 may be adjusted in order to provide a more constant optical density. Furthermore, dummy elements or additional material, such as opaque material, may be added to pattern areas having a lower optical density. It is appreciated that the modification of sensor pattern optical density is not in any way limited to these embodiments.

FIG. 4 illustrates exemplary conductive traces 310 and 312 that may be utilized to create a capacitive sensor pattern having improved uniform optical density in accordance with embodiments of the present invention. Specifically, a first set of conductive traces similar to trace 310 and a second set of conductive traces similar to trace 312 can be combined to form a repetitious array of sensor cells similar to cell 304. As such, the array is a larger sensor pattern that may be utilized as part of a capacitive sensor apparatus.

FIG. 5 illustrates exemplary conductive traces 310*a* and 312*a* that each include extensions in accordance with an embodiment of the present invention. It is understood that conductive traces 310*a* and 312*a* may be combined to generate a sensor pattern. Furthermore, a first set of conductive traces similar to conductive trace 310*a* may be combined with a second set of conductive traces similar to conductive trace 312*a* to create a sensor pattern (e.g., 600 of FIG. 6).

Specifically, conductive trace 310*a* includes trace extensions (e.g., 502) while conductive trace 312*a* also includes trace extensions (e.g., 504). It is appreciated that extensions 502 and 504 may also be referred to as stubs, dendrites or branches. Extensions 502 and 504 enable conductive traces 310*a* and 312*a*, respectively, to sense a user's finger and/or a probe in a wider vicinity. Additionally, dendrites 502 and 504 enable conductive traces 310*a* and 312*a*, respectively, to have better detection resolution. Furthermore, by including extensions 502 and 504 as part of conductive traces 310*a* and 312*a*, respectively, a fewer number of traces can be used to cover a sensing area of a capacitive sensing apparatus or its detection resolution can be improved. As such, an integrated circuit (IC) having a smaller number of channels for traces may be implemented as part of the capacitive sensing apparatus, thereby reducing the cost of the product.

Within FIG. 5, extensions 502 and 504 are each configured as a segmented spiral, which can also be referred to as a counter spiral. It is noted that these counter spirals provide greater effective sensor width for each conductive trace (e.g., 310a and 312a). As such, there can be more overlap between the sensing regions of adjacent conductive traces similar to trace 310a or 312a resulting in more ability to interpolate a set of signals as a position. It is understood that extensions 502 and 504 can be implemented in any configuration, design, layout, length and/or width in accordance with the present embodiment.

FIG. 6 is a capacitive sensor pattern 600 in accordance with an embodiment of the present invention. Specifically, capacitive sensor pattern 600 is implemented from a first set of conductive traces similar to conductive trace 310a in combination with a second set of conductive traces similar to conductive trace 312a resulting in a more uniform optical density sensor pattern. It is noted that the extensions (e.g., 502) of the first set of conductive traces similar to conductive trace 310a are "interdigitated" with the extensions of adjacent parallel conductive traces. The extensions (e.g., 504) of the second set of conductive traces similar to conductive trace 312a are interdigitated with the extensions of adjacent parallel conductive traces. Interdigitation can occur when one or more extensions of a first conductive trace extends beyond one or more extensions of a second conductive trace that is substantially parallel to the first trace. Furthermore, within sensor pattern 600, the first set of conductive traces similar to conductive trace 310a are intertwined with the second set of conductive traces similar to conductive trace 312a. Therefore, interdigitation occurs with traces that are substantially parallel while intertwining occurs between substantially nonparallel traces, such as orthogonal or perpendicular traces. Sensor pattern 600 has a substantially uniform distribution of conductive traces thereby providing a more uniform optical density sensor pattern.

FIG. 7 illustrates exemplary conductive traces 306a and 308a that each includes extensions in accordance with an embodiment of the present invention. It is appreciated that conductive traces 306a and 308a may be combined to generate a sensor pattern. Additionally, a first set of conductive traces similar to conductive trace 306a may be combined with a second set of conductive traces similar to conductive trace 308a to create a sensor pattern (e.g., 800 of FIG. 8).

Specifically, conductive trace 306a includes trace extensions (e.g., 702) while conductive trace 308a also includes trace extensions (e.g., 704). It is appreciated that extensions 702 and 704 may also be referred to as stubs, dendrites or branches. Extensions 702 and 704 enable conductive traces 306a and 308a, respectively, to sense a user's finger and/or a probe in a wider vicinity. Furthermore, branches 702 and 704 enable conductive traces 306a and 308a, respectively, to have better detection resolution. By including extensions 702 and 704 as part of conductive traces 306a and 308a, respectively, a fewer number of conductive traces can be used to cover a sensing area of a capacitive sensing apparatus while increasing its detection resolution.

Within FIG. 7, extensions 702 and 704 are each configured as a counter spiral. These counter spirals provide greater effective sensor width for each conductive trace (e.g., 306a and 308a). Therefore, there can be more overlap between the sensing regions of adjacent conductive traces similar to trace 306a or 308a resulting in more ability to interpolate a set of signals as a position. It is appreciated that extensions 702 and 704 can be implemented in any configuration, design, layout, length and/or width in accordance with the present embodiment.

FIG. 8 is a capacitive sensor pattern 800 in accordance with an embodiment of the present invention. Specifically, capacitive sensor pattern 800 is generated from a first set of conductive traces similar to conductive trace 306a in combination with a second set of conductive traces similar to conductive trace 308a. It is understood that the extensions (e.g., 702) of the first set of conductive traces similar to conductive trace 306a are interdigitated with the extensions of adjacent parallel conductive traces. Furthermore, the extensions (e.g., 704) of the second set of conductive traces similar to conductive trace 308a are interdigitated with the extensions of adjacent parallel conductive traces. Within sensor pattern 800, the first set of conductive traces similar to conductive trace 306a are intertwined with the second set of conductive traces similar to conductive trace 308a. As such, interdigitation occurs with traces that are substantially parallel while intertwining occurs between substantially nonparallel traces, such as orthogonal or perpendicular traces. Sensor pattern 800 has a substantially uniform distribution of conductive traces.

FIG. 9 illustrates exemplary conductive traces 306b and 308b that each includes extensions in accordance with an embodiment of the present invention. It is appreciated that conductive traces 306b and 308b may be combined to generate a sensor pattern. Furthermore, a first set of conductive traces similar to conductive trace 306b may be combined with a second set of conductive traces similar to conductive trace 308b to create a sensor pattern (e.g., 1000 of FIG. 10).

Specifically, conductive trace 306b includes trace extensions (e.g., 702a) while conductive trace 308b also includes trace extensions (e.g., 704a). It is appreciated that extensions 702a and 704a may also be referred to as stubs, dendrites or branches. Extensions 702a and 704a enable conductive traces 306b and 308b, respectively, to sense a user's finger and/or a probe in a wider vicinity. Furthermore, branches 702a and 704a enable conductive traces 306b and 308b, respectively, to have improved detection resolution. By including extensions 702a and 704a as part of conductive traces 306b and 308b, respectively, a fewer number of conductive traces can be used to cover a sensing area of a capacitive sensing apparatus while improving its detection resolution.

Within FIG. 9, extensions 702a are each configured as a linear "u" shape that is squared while extensions 704a are each configured as a modified linear "u" shape that is squared. These squared shapes provide greater effective sensor width for each conductive trace (e.g., 306b and 308b). As such, there can be overlap between the sensing regions of adjacent conductive traces similar to trace 306b or 308b resulting in more ability to interpolate a set of signals as a position. It is understood that extensions 702a and 704a can be implemented in any configuration, design, layout, length and/or width in accordance with the present embodiment.

FIG. 10 is a capacitive sensor pattern 1000 in accordance with an embodiment of the present invention. Specifically, capacitive sensor pattern 1000 is created from a first set of conductive traces similar to conductive trace 306b combined with a second set of conductive traces similar to conductive trace 308b. The extensions (e.g., 702a) of the first set of conductive traces similar to conductive trace 306b are interdigitated with the extensions of adjacent parallel conductive traces. Additionally, the extensions (e.g., 704a) of the second set of conductive traces similar to conductive trace 308b are interdigitated with the extensions of adjacent parallel conductive traces. Within sensor pattern 1000, the first set of conductive traces similar to conductive trace 306b are intertwined with the second set of conductive traces similar to conductive trace 308b. Sensor pattern 1000 has a substantially uniform distribution of conductive traces.

FIG. 11 illustrates an exemplary conductive sensor pattern 1100 including edge traces (e.g., 1104, 1106 and 1110) in accordance with an embodiment of the present invention. Within the present embodiment, edge traces (e.g., 1104, 1106 and 1110) couple traces (e.g., 1108 and 1109) that are truncated or "cut off" at the edge of sensor pattern 1100 to a conductive sensing trace similar to conductive sensing trace 306a or 308a. In this manner, substantial electrical symmetry is provided to a conductive sensing trace (e.g., 306a or 308a) about its center axis while also providing electrical uniformity along its length. This is desirable for each conductive sensing trace similar to conductive trace 306a or 308a of sensor pattern 1100.

For example, edge trace 1106 couples truncated conductive traces 1108 to a conductive trace similar to conductive trace 306a. In this manner, the uniform region of the electrical field of the conductive trace similar to trace 306a is extended to the edge of the sensing area of sensor pattern 1100. Furthermore, the coupled truncated traces (e.g., 1108 and 1109) also provide optical uniformity to sensor pattern 1100. It is noted that sensor pattern 1100 also includes truncated traces 1112 that remain uncoupled to a conductive sensing trace similar to trace 306a or 308a. However, these uncoupled remaining truncated traces (e.g., 1112) can provide optical uniformity to sensor pattern 1100. It is understood that the uncoupled truncated traces (e.g., 1112) can be referred to as dummy elements of sensor pattern 1100.

Within FIG. 11, it is appreciated that a group of conductive traces 1102 can be coupled to sensing circuitry (e.g., 110 of FIG. 1) that enables the operation of capacitive sensor pattern 1100.

FIG. 12 illustrates an exemplary capacitive sensor pattern 1200 with traces that include extensions in accordance with an embodiment of the present invention. Specifically, capacitive sensor pattern 1200 is created from a first set of conductive traces similar to conductive trace 306c combined with a second set of conductive traces similar to conductive trace 308c. The extensions (e.g., 702b) of the first set of conductive traces similar to conductive trace 306c cross traces of the second set of conductive traces similar to conductive trace 308c. Additionally, the extensions (e.g., 704b) of the second set of conductive traces similar to conductive trace 308c cross traces of the first set of conductive traces similar to conductive trace 306c. In this manner, there can be overlap between the sensing regions of conductive traces similar to trace 306c or 308c resulting in more ability to interpolate a set of signals as a position. It is understood that extensions 702b and 704b can be implemented in any configuration, design, layout, length and/or width in accordance with the present embodiment.

FIG. 13 is a capacitive sensor pattern 1300 in accordance with an embodiment of the present invention. Specifically, capacitive sensor pattern 1300 is created from a first set of conductive traces similar to conductive trace 306d combined with a second set of conductive traces similar to conductive trace 308d. It is noted that conductive traces 306d and 308d each have varying widths. The varying of the widths of conductive traces 306d and/or 308d can be implemented to adjust their optical density or to adjust their capacitive sensitivity at a given location. For example, conductive traces 306d and/or 308d can be implemented such that the trace width tapers as it extends farther from a trace crossing thereby enabling an interpolation function to operate more smoothly. It is understood that conductive traces 306d and 308d can each be implemented in a wide variety of varying widths in accordance with the present embodiment. Furthermore, conductive traces 306d and 308d are not limited to the configuration shown. As such, conductive traces 306d and 308d can each be implemented in any configuration and width in accordance with the present embodiment. It is noted that any portion of any conductive trace (along with its one or more extensions if applicable) shown and/or described herein can be implemented with varying width in accordance with embodiments of the present invention.

FIG. 14 illustrates an exemplary sensor pattern 1400 including dummy elements 1402 in accordance with an embodiment of the present invention. Specifically, dummy elements 1402 (which may comprise, for example, additional material that may be opaque material) have been included as part of sensor pattern 1400 for optical density purposes. Additionally, capacitive sensor pattern 1400 includes a first set of conductive traces similar to conductive trace 306d in combination with a second set of conductive traces similar to conductive trace 308d. It is noted that dummy elements 1402 may be implemented as any shape, opacity, material, width and/or size. Furthermore, dummy elements 1402 may be implemented in any manner to provide a desired optical density. An uncoupled or electrically unconnected trace, element, or material of a sensor pattern (e.g., 1400) can be referred to as a dummy element (e.g., 1402).

It is appreciated that one or more dummy elements (e.g., 1402) may be included as part of or with any sensing pattern described herein for any reason, such as, optical density purposes. For example, a short stub of a dummy element may be disposed in a gap within a set of conductive sensor traces.

FIG. 15 illustrates an exemplary "ladder" redundant conductive pattern 1500 for a capacitive sensing apparatus in accordance with an embodiment of the present invention. Ladder redundant pattern 1500 is generated from a set of redundant conductive traces similar to ladder redundant conductive trace 1502. The redundant trace 1502 provides a tolerance to local open-circuit defects that can occur with a conventional conductive trace (e.g., a speck of dust in a photolithography process, a scratch, or the like). Specifically, ladder redundant trace 1502 includes redundant electrical paths such that if there is an open-circuit defect, there is an alternative electrical path enabling ladder trace 1502 to remain fully functional except for the defect. In other words, if there is a point defect anywhere in ladder redundant trace 1502, it results in the loss of the defective area but ladder trace 1502 remains operational. It is noted that ladder redundant trace 1502 is a fully redundant trace.

Conversely, if a conventional conductive sensor trace has an open-circuit defect, it is non-functional or everything to one side of the break is disconnected from the circuitry that drives it. As such, the yield of a capacitive sensor manufacturing process is diminished. Therefore, ladder redundant pattern 1500 of the present embodiment increases the yield of a capacitive sensor manufacturing process by providing a solution to the open circuit defect problem.

Within FIG. 15, ladder conductive trace 1502 is formed by conductive traces 1504 and 1506, which are substantially parallel. Additionally, there are conductive "rungs" 1508 which couple conductive traces 1504 and 1506. It is understood that rungs 1508 are shown perpendicular to conductive traces 1504 and 1506 and spaced in a substantial equal manner. However, rungs 1508 can be positioned between conductive traces 1504 and 1506 having any type of spacing. Furthermore, rungs 1508 can be oriented in any manner with respect to conductive traces 1504 and 1506.

It is noted that a ladder redundant conductive trace similar to trace 1502 can be implemented in almost any configuration, design, and/or layout. For example, FIG. 15 illustrates sensor pattern cell 302*a* that is formed by ladder redundant conductive traces 306*e* and 308*e*. In this manner, sensor pattern cell 302*a* includes redundant electrical paths that provide a certain tolerance level to open-circuit defects.

FIG. 16 illustrates other exemplary redundant patterns in accordance with embodiments of the present invention. Specifically, FIG. 16 illustrates an exemplary "brickwork" redundant pattern 1600, an exemplary hexagonal or "hex" redundant pattern 1620, and an exemplary "railroad" redundant pattern 1640. It is appreciated that "brickwork" redundant pattern 1600, "hex" redundant pattern 1620, and "railroad" redundant pattern 1640 each provide functionality similar to that of "ladder" redundant pattern 1500. For example, conductive redundant patterns 1600, 1620 and 1640 each provides a tolerance to local open-circuit defects that can occur with a conventional conductive trace (e.g., a speck of dust in a photolithography process, a scratch, or the like). Specifically, redundant patterns 1600, 1620 and 1640 each includes redundant electrical paths such that if there is an open-circuit trace defect, there is an alternative electrical path enabling the pattern to remain functional. It is noted that redundant patterns 1600 and 1620 are fully redundant while railroad redundant pattern 1640 is partially redundant.

More specifically, brickwork redundant pattern 1600 is created from a set of redundant conductive traces similar to brickwork redundant conductive trace 1602. The brickwork redundant conductive trace 1602 is formed by conductive traces 1604, 1606 and 1608, which are substantially parallel. Furthermore, there are conductive elements or "rungs" 1610 which are coupled between conductive traces 1604 and 1606. Additionally, rungs 1610 are also coupled between conductive traces 1606 and 1608. It is appreciated that rungs 1610 are shown perpendicular to conductive traces 1604, 1606 and 1608. The spacing of rungs 1610 between 1604 and 1606 are such that they alternate with the spacing of rungs 1610 between 1606 and 1608. However, rungs 1610 can be positioned between conductive traces 1604, 1606 and 1608 with any type of spacing. Rungs 1610 can also be oriented in a wide variety of ways with respect to conductive traces 1604, 1606 and 1608. It is noted that a brickwork redundant conductive trace similar to trace 1602 can be implemented in almost any configuration, design, and/or layout.

Within FIG. 16, hex redundant pattern 1620 is created from a set of redundant conductive traces similar to hex redundant conductive trace 1622. The hex redundant conductive trace 1622 is formed by conductive traces 1624, 1626 and 1628, which are substantially horizontal. Furthermore, there are conductive elements 1630 which are coupled between conductive traces 1624 and 1626. Additionally, elements 1630 are also coupled between conductive traces 1626 and 1628. It is appreciated that elements 1630 form hexagons between traces 1624 and 1626 and also between traces 1626 and 1628. However, elements 1630 can be positioned between conductive traces 1624, 1626 and 1628 with any type of spacing. Elements 1630 can also be oriented in a wide variety of ways with respect to conductive traces 1624, 1626 and 1628. It is noted that a hex redundant conductive trace similar to trace 1622 can be implemented in almost any configuration, design, and/or layout. A set of hex redundant conductive traces similar to trace 1622 can be implemented to provide improved uniform optical density.

The railroad redundant conductive pattern 1640 is created from a set of redundant conductive traces similar to railroad redundant conductive trace 1642. The railroad redundant conductive trace 1642 is formed by conductive traces 1644 and 1646, which are substantially parallel. Additionally, there are conductive "ties" 1648 which are coupled between and extend beyond conductive traces 1644 and 1646. Specifically, ties 1648 include extensions 1650 that extend beyond conductive traces 1644 and 1646, which are not protected from open-circuit defects by redundant current paths. As such, the railroad redundant pattern 1640 can be referred to as a partially redundant pattern. It is understood that ties 1648 are shown perpendicular to conductive traces 1644 and 1646 and spaced in a substantial equal manner. The ties 1648 of railroad redundant conductive trace 1642 are offset within the present embodiment by half a pitch from the ties of the railroad redundant conductive trace located above trace 1642. In this manner, the ties 1648 of railroad redundant conductive trace 1642 can be interleaved with the ties of a railroad redundant conductive trace similar to trace 1642. Additionally, the offsetting of the ties can be implemented in order to adjust the optical density of railroad sensor pattern 1640. However, ties 1648 can be positioned across conductive traces 1644 and 1646 having any type of spacing. Furthermore, ties 1648 can be oriented in a wide variety of ways with respect to conductive traces 1644 and 1646. It is understood that a railroad redundant conductive trace similar to trace 1642 can be implemented in almost any configuration, design, and/or layout.

It is noted that redundant patterns 1500, 1600, 1620 and 1640, described herein, can be incorporated into a touch pad and/or touch screen capacitive sensing device or apparatus.

FIG. 17 illustrates an exemplary multiple intertwined sensor pattern 1700 in accordance with embodiments of the present invention. The multiple intertwined sensor pattern 1700 is created by a first set of multiple conductive traces similar to multiple conductive traces 306*f*, 306*g* and 306*h* in combination with a second set of multiple conductive traces similar to multiple conductive traces 308*f*, 308*g* and 308*h*. The first and second sets of multiple conductive traces are intertwined with each other. It is noted that the multiple intertwined sensor pattern 1700 can be utilized for different functions. For example, if conductive traces 306*f*, 306*g*, and 306*h* are coupled to the same sensor circuitry, they can act as a set of redundant conductive traces for each other. Additionally, if conductive traces 308*f*, 308*g*, and 308*h* are coupled to the same sensor circuitry, they can also act as a set of redundant conductive traces for each other.

Within the present embodiment, it is noted that the location where conductive traces 306*f*, 306*g*, and 306*h* cross conductive traces 308*f*, 308*g*, and 308*h* can be referred to as an intersection.

FIG. 18 illustrates an exemplary capacitive sensing apparatus 1800 that includes guard traces 1802 in accordance with embodiments of the present invention. Guard traces 1802 may be electrically driven, grounded, and/or held at a substantially fixed or constant potential in accordance with embodiments of the present invention. Guard traces 1802 can be located between adjacent conductive sensor traces 1804 and can reduce the parasitic capacitive coupling that can occur between them thereby improving the resolution of the capacitive sensor apparatus 1800.

It is understood that a touch pad or touch screen typically has two sets of substantially perpendicular sensor traces and may have more than one set of guard traces (in addition to perhaps having other non-guard traces). However, for clarity, only one set of conductive sensor traces 1804 and one set of guard traces 1802 are shown within FIG. 18. If guard traces 1802 were not implemented as part of capacitive sensing apparatus 1800, adjacent neighbor traces of sensor traces 1804 could be strongly coupled by parasitic capacitance, which reduces the resolution of capacitive sensor. However, by including guard traces 1802 between adjacent conductive traces 1804, the coupling can be reduced. Furthermore, guard traces 1802 can also reduce the coupling between perpendicular conductive sensor traces (not shown).

Within FIG. 18, the guard traces 1802 are coupled to a guard signal 1808. Within the present embodiment, guard signal 1808 may be a ground signal; in this manner, guard traces 1802 are functioning as grounded traces. Alternatively, guard signal 1808 may be a constant potential signal; in this manner, guard traces 1802 are functioning as constant potential traces. Guard signal 1808 may also be actively driven; in this manner, guard traces 1802 are functioning as driven guard traces. It is understood that guard signal 1808 may be implemented in a wide variety of ways in accordance with the present embodiment. For example, guard signal 1808 can be implemented by active electronics that generate signals that match or actively cancel the coupling between adjacent sensor traces 1804. The signal used to drive the guard electrodes 1802 can be a copy of the waveform used to drive sensor traces 1804, with a low impedance drive circuit. For instance, it may be a voltage follower that actively recreates the voltages seen on the nearby sensor traces 1804. Additionally, multiple guard signals can be used with multiple guard traces (or grounded or fixed potential traces) or multiple sets of guard traces (or grounded or fixed potential traces) to shield particular portions of the sensor, or to cancel particular interferences.

It is noted that the use of guard electrodes 1802 between sensor electrodes 1804 can reduce the current utilized to drive the sensor electrodes 1804. This in turn can allow the use of larger sensors 1804 than would have been possible without the guard electrodes 1802.

Within FIG. 18, sensor drive circuitry 1806 is coupled to capacitive conductive sensor traces 1804 thereby enabling their proper operation. Additionally, guard traces 1802 are located between and near the capacitive conductive sensor traces 1804.

It is noted that guard traces (or grounded or fix potential traces) similar to guard traces 1802 can also be included as part of or with any sensing pattern described herein for optical density purposes. For example, multiple guard traces, a single guard trace, or a portion of a guard trace can be disposed in a gap within a set of conductive sensor traces to adjust or improve optical uniformity.

It is understood that adjusting the optical density and optical uniformity of a sensor apparatus as desired may be implemented in a wide variety of ways. Additional material, such as opaque material, can be patterned, etched, deposited, drawn, or disposed in any other manner to change the optical density of a viewable region. Examples include dummy elements, dummy traces, guard traces, and additional sensor or other traces. Alternatively, materials with different optical properties such as transmittance or reflectance characteristics can be selectively used in different regions to achieve apparent optical uniformity in a region. In addition, material may also be removed in the sensor apparatus to adjust optical density; for example, a substrate or a cover sheet can be thinned in selected regions, or have holes in selected volumes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A capacitive sensor apparatus comprising:
   a first set of interdigitated conductive traces; and
   a second set of interdigitated conductive traces intertwined with said first set of interdigitated conductive traces.

2. The capacitive sensor apparatus as described in claim 1, wherein said first and second sets of interdigitated conductive traces are utilized as part of a capacitive touch screen device.

3. The capacitive sensor apparatus as described in claim 2, wherein said first and second sets of interdigitated conductive traces provide substantially uniform optical density for said capacitive touch screen device.

4. The capacitive sensor apparatus as described in claim 2, further comprising:
   an additional material, wherein said first and second sets of interdigitated conductive traces and said additional material provide substantially uniform optical density for said capacitive touch screen device.

5. The capacitive sensor apparatus as described in claim 1, wherein said first and second sets of interdigitated conductive traces are utilized as part of a capacitive touch pad device.

6. The capacitive sensor apparatus as described in claim 1, wherein at least one of said first set of interdigitated conductive traces comprises a set of redundant conductive elements.

7. The capacitive sensor apparatus as described in claim 6, wherein said set of redundant conductive elements has a configuration selected from a group consisting of: a ladder pattern, a railroad pattern, a brickwork pattern, and a hexagonal pattern.

8. The capacitive sensor apparatus as described in claim 1, wherein a trace of said first set of interdigitated conductive traces and a trace of said second set of interdigitated conductive traces cross only at one intersection.

9. The capacitive sensor apparatus as described in claim 1, wherein said first set of interdigitated conductive traces comprises a counter spiral.

10. The capacitive sensor apparatus as described in claim 1, further comprising:
    a guard trace located near said first set of interdigitated conductive traces, wherein said guard trace is electrically driven, grounded, or held at a substantially fixed potential.

11. The capacitive sensor apparatus as described in claim 1, wherein said first set of interdigitated conductive traces comprises a trace having varying width.

12. The capacitive sensor apparatus as described in claim 1, further comprising:

a first edge trace electrically coupled to at least one trace of said first set of interdigitated conductive traces.

13. The capacitive sensor apparatus as described in claim 12, further comprising:
a second edge trace electrically coupled to at least one trace of said second set of interdigitated conductive traces.

14. A capacitive position sensor apparatus comprising:
a first set of conductive traces, wherein at least one of said first set of conductive traces comprises a first set of redundant conductive elements; and
a second set of conductive traces, wherein at least one of said second set of conductive traces comprises a second set of redundant conductive elements, wherein said first set of redundant conductive elements is intertwined with said second set of redundant conductive traces.

15. The capacitive position sensor apparatus as described in claim 14, wherein said first and second sets of conductive traces and said first and second sets of redundant conductive elements are utilized as part of a capacitive touch screen device.

16. The capacitive position sensor apparatus as described in claim 15, wherein said first and second sets of conductive traces provide substantially uniform optical density for said capacitive touch screen device.

17. The capacitive position sensor apparatus as described in claim 15, wherein said first and second sets of redundant conductive elements provide substantially uniform optical density for said capacitive touch screen device.

18. The capacitive position sensor apparatus as described in claim 14, further comprising:
an additional material, wherein said first and second sets of conductive traces, and said additional material provide substantially uniform optical density for said capacitive touch screen device.

19. The capacitive position sensor apparatus as described in claim 14, wherein said first and second sets of conductive traces and said first and second sets of redundant conductive elements are utilized as part of a capacitive touch pad device.

20. The capacitive position sensor apparatus as described in claim 14, wherein said first set of redundant conductive elements has a configuration selected from a group consisting of: a ladder pattern, a railroad pattern, a brickwork pattern, and a hexagonal pattern.

21. The capacitive position sensor apparatus as described in claim 20, wherein said second set of redundant conductive elements has a configuration selected from a group consisting of: a ladder pattern, a railroad pattern, a brickwork pattern, and a hexagonal pattern.

22. The capacitive position sensor apparatus as described in claim 14, wherein a trace of said first set of conductive traces and a trace of said second set of conductive traces cross only at one intersection.

23. The capacitive position sensor apparatus as described in claim 14, wherein an element of said first set of redundant conductive elements and an element of said second set of redundant elements cross only at one intersection.

24. The capacitive position sensor apparatus as described in claim 14, wherein said first set of conductive traces comprises a counter spiral.

25. The capacitive position sensor apparatus as described in claim 14, wherein said first set of redundant conductive elements has a configuration comprising a counter spiral.

26. The capacitive position sensor apparatus as described in claim 14, further comprising:

a guard trace located near said first set of conductive traces, wherein said guard trace is electrically driven, grounded, or held at a substantially constant potential.

27. The capacitive position sensor apparatus as described in claim 14, wherein said first set of redundant conductive elements comprises an element having varying width.

28. The capacitive position sensor apparatus as described in claim 14, wherein said first set of conductive traces comprises a trace having varying width.

29. The capacitive position sensor apparatus as described in claim 14, further comprising:
a first edge trace electrically coupled to at least one trace of said first set of conductive traces.

30. The capacitive position sensor apparatus as described in claim 29, further comprising:
a second edge trace electrically coupled to at least one trace of said second set of conductive traces.

31. A capacitive sensor apparatus comprising:
a first set of interdigitated conductive traces comprising a trace having varying width; and
a second set of interdigitated conductive traces intertwined with said first set of conductive traces.

32. The capacitive sensor apparatus as described in claim 31, wherein said second set of conductive traces comprises a trace having varying width.

33. The capacitive sensor apparatus as described in claim 31, wherein said first and second sets of conductive traces are utilized as part of a capacitive touch screen device.

34. The capacitive sensor apparatus as described in claim 33, wherein said first and second sets of conductive traces provide substantially uniform optical density for said capacitive touch screen device.

35. The capacitive sensor apparatus as described in claim 33, further comprising:
an additional material, wherein said first and second sets of conductive traces, and said additional material provide substantially uniform optical density for said capacitive touch screen device.

36. The capacitive sensor apparatus as described in claim 31, further comprising:
an additional conductive material proximate to said first set of conductive traces.

37. The capacitive sensor apparatus as described in claim 31, wherein said first and second sets of conductive traces are utilized as part of a capacitive touch pad device.

38. The capacitive sensor apparatus as described in claim 31, wherein a trace of said first set of conductive traces and a trace of said second set of conductive traces cross only at one intersection.

39. The capacitive sensor apparatus as described in claim 31, further comprising:
a guard trace located near said first set of conductive traces, wherein said guard trace is electrically driven, grounded, or held at a substantially constant potential.

40. The capacitive sensor apparatus as described in claim 31, further comprising:
a first edge trace electrically coupled to at least one trace of said first set of conductive traces.

41. The capacitive sensor apparatus as described in claim 40, further comprising:
a second edge trace electrically coupled to at least one trace of said second set of conductive traces.

42. A capacitive position sensor apparatus comprising:
a first set of conductive traces, wherein at least one of said first set of conductive traces comprises a first set of redundant conductive elements; and a second set of conductive traces, wherein at least one of said second set of conductive traces comprises a second set of redundant conductive elements, wherein an element of said first set of redundant conductive elements and an element of said second set of redundant elements cross only at one intersection.

* * * * *